ND

While the reactions in the ensuing examples were performed in the presence of potassium hydroxide, other alkaline reacting materials may be used. Further, the temperature at which the reaction is run is not critical, temperatures in the range of about 50° to about 200° C. being operable. The reaction can be performed as a batch or a continuous process and under pressures below, at or above atmospheric pressure.

The following examples illustrate the preparations of the new compositions of the present invention. In these examples excess alcohol (reactant) was used as solvent.

EXAMPLE I

*Preparation of 1,2,3,4,7-pentachloro-7-isopropoxy-bicyclo-(2.2.1)-2,5-heptadiene*

1,2,3,4,7,7-hexachlorobicyclo-(2.2.1)-heptadiene (604 grams; 2.02 mol) was placed in a three-necked reaction vessel equipped with stirrer, thermometer, heating mantle and reflux condenser and containing potassium hydroxide (190 grams; 2.90 mol) and isopropyl alcohol (868.0 grams; 14.4 mol). The reaction mixture was heated to reflux, approximately 90° C., and maintained at reflux for about four hours.

The unreacted material was removed by distillation under reduced pressure and the residue was then dissolved in diethyl ether. This ether solution was washed with water, dried over anhydrous sodium sulfate and the diethyl ether removed by distillation under reduced pressure. The desired product was recovered by fractionation of the residue of the diethyl ether removal as the fraction with a boiling point of 99–105° C. at 0.8 mm. of Hg pressure. This crude product was purified by chromatographic means. Its boiling point was found to be 105° C. at 0.8 mm. Hg and its refractive index $N_D^{20}$ 1.5213.

The compound was analyzed for $C_{10}H_9Cl_5O$:

|  | C | H | Cl |
|---|---|---|---|
| Theoretical | 37.24 | 2.81 | 54.97 |
| Found | 36.89 | 2.85 | 55.43 |

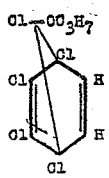

EXAMPLE II

*Preparation of 1,2,3,4,7-pentachloro-7-ethoxybicyclo (2.2.1)-2,5-heptadiene*

1,2,3,4,7,7-hexachlorobicyclo (2.2.1)-2,5-heptadiene (600 grams; 2.0 mol) was placed in a three-necked glass reaction vessel equipped with stirrer, thermometer, heating mantle and reflux condenser and containing potassium hydroxide (204 grams; 3.6 mol) and ethyl alcohol (670 grams; 14.6). The reaction mixture was heated to reflux and allowed to reflux for five hours.

At the end of the five-hour reaction time, the unreacted alcohol was removed by use of reduced pressure. The residue from this distillation was immersed in water and extracted with diethyl ether. This ether layer was separated from the aqueous layer and dried over anhydrous sodium sulfate. The desired product was then recovered by distillation as the fraction boiling at 118° C. at 1.5 mm. Hg pressure. It was found to have a refractive index at 20° C. of 1.5330. It was analyzed for chlorine content of $C_9H_7Cl_5O$:

Theoretical _____ 57.48
Found _____ 57.50

Its structure is:

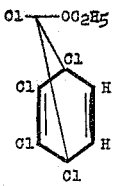

EXAMPLE III

*Preparation of 1,2,3,4,7-pentachloro-7-allyloxy bicyclo (2.2.1)-2,5-heptadiene*

1,2,3,4,7,7 - hexachlorobicyclo (2.2.1)-2,5-heptadiene (604 grams; 2.02 mol) is placed in a three-necked glass reaction vessel equipped with stirrer, heating mantle, thermometer and reflux condenser and containing potassium hydroxide (190 grams; 2.90 mol) and allyl alcohol (870 grams; 15.0 mol). The reaction mixture is heated to reflux and maintained at reflux for approximately four hours. The unreacted material is removed by distillation under reduced pressure. The desired product is recovered by extracting the residue with diethyl ether, washing this extract with water, drying it over anhydrous sodium sulfate and a final distillation. Its structure is:

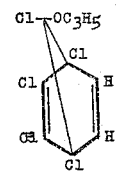

EXAMPLE IV

*Preparation of 1,2,3,4,7-pentachloro-7-phenoxy-bicyclo (2.2.1)-2,5-heptadiene*

1,2,3,4,7,7 - hexachlorobicyclo (2.2.1)-2,5-heptadiene (600 grams; 2.0 mol) is placed in a three-necked glass reaction vessel equipped with stirrer, thermometer, heating mantle and reflux condenser and containing potassium hydroxide (204 grams; 3.6 mol) and phenol (338.4 grams; 3.6 mol). The reaction mixture is heated to reflux and allowed to reflux for four hours.

At the end of the reaction period the unreacted material is removed by use of reduced pressure. The residue from the distillation is immersed in water and extracted with diethyl ether. The ether layer is separated from the aqueous layer and dried over anhydrous sodium sulfate. The desired product is then recovered by distillation. Its structure is:

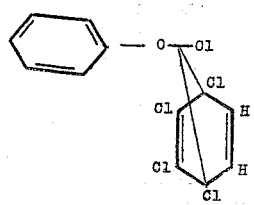

EXAMPLE V

*Preparation of 1,2,3,4,7-pentachloro-7-cyclopentenoxy-bicyclo (2.2.1)-2,5-heptadiene*

1,2,3,4,7,7 - hexachlorobicyclo (2.2.1)-2,5-heptadiene (600 grams; 2.0 mol) is placed in a three-necked glass reaction vessel equipped with stirrer, thermometer, heating mantle and reflux condenser and containing potassium hydroxide (204 grams; 3.6 mol) and cyclopenten-3-ol (336 grams; 4.0 mol). The reaction mixture is heated to reflux and allowed to reflux for five hours.

At the end of the five-hour reaction time, the unreacted material is removed by use of reduced pressure. The residue of this distillation is immersed in water and extracted with diethyl ether. This ether layer is separated from the aqueous layer and dried over anhydrous sodium sulfate. The desired product is then recovered by distillation. Its structure is:

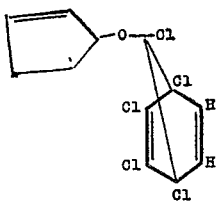

As previously indicated, the compositions of the present invention possess beneficial insecticidal and fungicidal properties useful in the control of a multitude of undesirable organisms. This desirable combination allows the user to protect against insect pests and fungi with a single application, thus reducing both labor and equipment requirements and improving the economics while providing superior protection. The following tests illustrate the unique properties of the compositions of the present invention. Throughout these tests, the product of Example I was used. However, these beneficial properties should not be construed as limited thereto.

TEST A

Four-week-old tomato plants were sprayed at a concentration of 400 p.p.m. of the test compound. The plants were then allowed to dry, inoculated with spore suspension of *Alternaria solani,* and then incubated in moist chambers at 72° F. Plants were removed 24–48 hours later and the number of lesions on the three main leaves of each plant counted. The percentage control was 40%.

TEST B

Two milliliters of a one percent acetone solution of 1,2,3,4,7 - pentachloro-7-isopropoxy-bicyclo (2.2.1)-2,5-heptadiene were applied to a 125 mm. filter paper. The solvent was removed by volatilization and houseflies were caged over the treated paper. At the end of 24 hours, the mortality of said flies was 45.8%.

These compositions may be applied in accordance with the standard techniques for the application of fungicides and insecticides. Thus, while they may be used in their pure form, it is often more desirable to formulate them with inert carrier materials, wetting agents, stickers and the like so as to prepare emulsions, wettable powders, dusts, fogs and other formulations suited to the specific application. The exact ingredients of such formulations will of course depend on the particular factors, such as the material being protected, type of organism being controlled, available equipment, etc.

Thus, the compositions of the present invention can be dusted onto the material being protected, or the material being protected can be dipped into an emulsion or solution of these new compounds, or a solution of said compounds may be sprayed onto the material being protected. The following formulations represent useful combinations, but are only a few of the valuable formulations which may be prepared from these new compounds for use as insecticides and/or fungicides.

FORMULATION A

| | Percent by weight |
|---|---|
| Product of Example I | 20 |
| Celite 209 | 80 |

Celite 209 is a diatomaceous earth used herein as a relatively inert carrier material. If desired, this combination may be reduced to a smaller particle size to insure proper distribution.

FORMULATION B

| | Percent by weight |
|---|---|
| Product of Example II | 25 |
| Micro Cel 800 | 72 |
| Triton X-100 | 3 |

Micro Cel 800 is a synthetic, relatively inert, porous carrier material substantially composed of calcium silicate. Triton X-100 is a wetting agent, chemically being an alkyl aryl polyether alcohol. This composition is a wettable powder.

In addition to their above described utility as a fungicide and insecticide, the new compositions of the present invention are valuable intermediates in the preparation of many highly useful compositions. As described in my aforesaid copending patent application Serial Number 651,173, the Diels-Alder adduction product of the present compositions and a conjugated diene such as cyclopentadiene is a superior insecticide and it too is a precursor for further products by means of halogenation and other like reactions. Also, these new compounds may be reacted by means other than Diels-Alder adduction, such as is feasible with other olefins producing extremely interesting products having the pentachlorobicyclo (2.2.1)-heptene ether configuration.

I claim:

1.

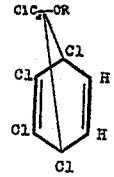

wherein R is selected from the group consisting of aliphatic, cycloaliphatic and aryl hydrocarbon radicals containing up to 14 carbon atoms.

2. 1,2,3,4,7 - pentachloro-7-ethoxy bicyclo (2.2.1)-2,5-heptadiene.

3. 1,2,3,4,7 - pentachloro-7-isopropoxy bicyclo (2.2.1)-2,5-heptadiene.

4. 1,2,3,4,7-pentachloro-7-allyloxy bicyclo (2.2.1)-2,5-heptadiene.

5. 1,2,3,4,7-pentachloro - 7 - phenoxy bicyclo (2.2.1)-2,5-heptadiene.

6. 1,2,3,4,7-pentachloro - 7 - cyclopentenoxy bicyclo (2.2.1)-2,5-heptadiene.

References Cited in the file of this patent

UNITED STATES PATENTS 2,697,103   Ordas _____ Dec. 14, 1954